(12) United States Patent
Ali et al.

(10) Patent No.: US 6,969,110 B2
(45) Date of Patent: Nov. 29, 2005

(54) IMPACT LOAD TRANSFER ELEMENT

(75) Inventors: Akram Ali, Livonia, MI (US); Jason Foster, Waterford, MI (US); Michael Gorecki, Auburn Hills, MI (US); Gary Pitt, Farmington Hills, MI (US); Michael Beavon, Rochester Hills, MI (US); Mark Kirschmann, Clarkston, MI (US); Christopher M Slon, Beverly Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/632,758

(22) Filed: Aug. 1, 2003

(65) Prior Publication Data

US 2005/0023859 A1 Feb. 3, 2005

(51) Int. Cl.⁷ ................................................. B60J 5/00
(52) U.S. Cl. .............................. 296/187.12; 296/146.6
(58) Field of Search ..................... 296/187.02, 187.12, 296/146.6

(56) References Cited

U.S. PATENT DOCUMENTS

| | | | |
|---|---|---|---|
| 4,272,103 A * | 6/1981 | Schmid et al. .............. 280/751 |
| 5,066,064 A * | 11/1991 | Garnweidner ............ 296/146.6 |
| 5,171,058 A * | 12/1992 | Ishikawa ................ 296/187.12 |
| 5,255,953 A * | 10/1993 | Frank ....................... 296/146.6 |
| 5,573,298 A * | 11/1996 | Walker et al. .......... 296/187.12 |
| 6,036,251 A * | 3/2000 | Yagishita et al. ........... 296/39.1 |
| 6,203,096 B1 * | 3/2001 | Noda et al. .............. 296/146.6 |
| 6,237,987 B1 * | 5/2001 | Babatz et al. ............. 296/146.6 |
| 6,312,045 B2 * | 11/2001 | Kitagawa ................ 296/187.12 |
| 6,550,850 B2 * | 4/2003 | Laborie et al. .......... 296/146.6 |
| 6,688,671 B2 * | 2/2004 | Fukutomi ................ 296/146.6 |
| 2002/0113462 A1 * | 8/2002 | Heranney .................... 296/189 |
| 2002/0158486 A1 * | 10/2002 | Dauvergne et al. ....... 296/146.6 |

* cited by examiner

*Primary Examiner*—Joseph D. Pape
(74) *Attorney, Agent, or Firm*—Ralph E. Smith

(57) ABSTRACT

A door assembly includes an inner panel, an outer panel fixedly attached to the inner panel, and a load transfer element disposed within an interstitial space formed between the inner and outer panels. The load transfer element includes a main body defining a longitudinal axis extending from the inner panel to the outer panel and first and second reaction surfaces disposed on the main body. The first reaction surface is formed proximate the inner panel while the second reaction surface is formed generally opposite the first reaction surface and proximate the outer panel. The second reaction surface is operable to receive a load from the outer panel and to transmit the load through the main body to the first reaction surface and the door inner panel. The load transfer element is further configured to activate an air bag sensor when the load exceeds a predetermined magnitude.

14 Claims, 4 Drawing Sheets

IMPACT LOAD TRANSFER ELEMENT

FIELD OF THE INVENTION

The present invention relates to vehicle structure, and more particularly, to a load transfer element for an improved vehicle structure.

BACKGROUND OF THE INVENTION

In vehicle design, safety and crashworthiness is increasingly important. To that end, vehicle structure and safety systems play a significant role. Modern vehicle safety systems commonly include a variety of devices such as seat belts and air bags to help protect a passenger in the event of an accident. Such systems are commonly designed to work together to improve overall vehicle safety and provide the best possible protection for vehicle occupants.

In one such safety system, a side air bag is utilized in conjunction with a seating system to protect an occupant in the event that the vehicle is struck at a side of the vehicle. To ensure proper timing of an air bag system, an air bag sensor is typically utilized to detect an acceleration profile experienced by a vehicle and to send a signal to the air bag. If the acceleration profile is above a predetermined limit, the sensor will cause the air bag to deploy as soon as possible to ensure that the air bag is in position in a timely manner to ensure proper occupant restraint. If the acceleration profile is below a predetermined limit, the sensor will not send a signal to the air bag and the air bag will not deploy. In this manner, air bags are commonly designed to deploy only when the sensor detects a predetermined acceleration profile and to prevent deployment when the vehicle experiences a low speed impact. To prevent deployment of an air bag during a low speed impact, conventional air bag sensors are commonly disposed within a structure such as sheet metal that usually deforms before the air bag sensor receives the signal. Such systems may have a slight delay in the deployment of the air bag under a high speed or high load impact due to the air bag sensor being disposed within a structure of the vehicle.

Therefore, a vehicle safety system that provides for immediate deployment of an air bag following a high speed or high impact event while concurrently preventing deployment of the air bag under a low speed or low impact event is desirable in the industry.

SUMMARY OF THE INVENTION

Accordingly, the present invention provides a door assembly including an inner panel, an outer panel fixedly attached to the inner panel, and a load transfer element disposed within an interstitial space formed between the inner and outer panels. The load transfer element includes a main body defining a longitudinal axis extending from the inner panel to the outer panel and first and second reaction surfaces disposed on the main body. The first reaction surface is formed proximate the inner panel while the second reaction surface is formed generally opposite the first reaction surface and proximate the outer panel. The second reaction surface is operable to receive a load from the outer panel and to transmit the load across the main body generally along the longitudinal axis to the first reaction surface and the door inner panel. The inner panel is disposed proximate a vehicle structure, whereby the load is quickly transferred to the vehicle structure to communicate the load to a sensor disposed on the vehicle structure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

DETAILED DESCRIPTION OF THE PREFERRED EMBODIMENTS

Figure 1:
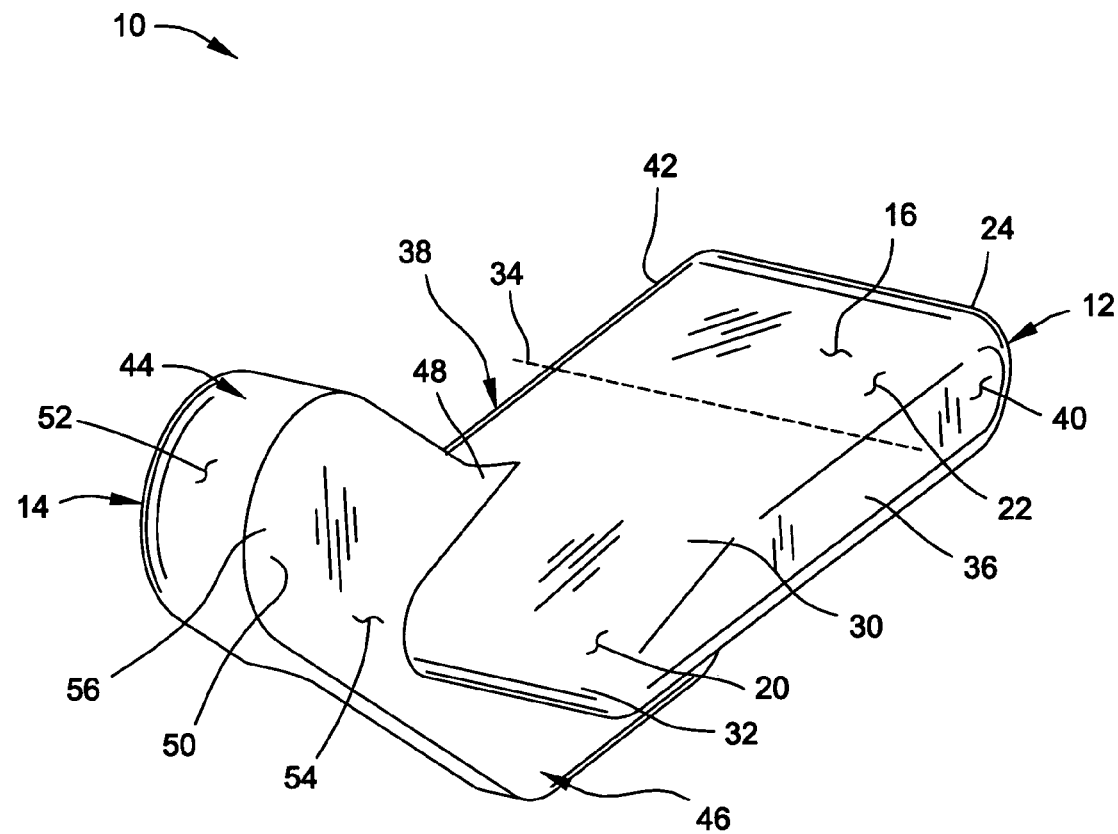
FIG. 1 is a perspective view of a load transfer element in accordance with the principals of the present invention.

With reference to the figures, a load transfer element 10 is provided and includes a main body 12 and an attachment arm 14. The load transfer element 10 is connected to an external structure via attachment arm 14 and is operable to receive and transfer a load across the main body 12.

The main body 12 is formed from a rigid material such as, but not limited to, hard foam and the like. The main body 12 includes a top surface 16, a lower surface 18, and an arcuate surface 20. The top surface 16 includes a planar surface 22 extending between the arcuate surface 20 and a distal end 24. The lower surface 18 is formed on an opposite side of the main body 12 from said top surface 16 and includes a planar surface 26 extending from the arcuate surface 20 to the distal end 24. The arcuate surface 20 is formed at the intersection of the top and bottom surfaces 16, 18 and includes a top portion 30 terminating at a rounded end 32, as best shown in FIG. 3.

The main body 12 further includes a transverse axis 34 extending between an outer end 36 and an inner end 38, as best shown in FIG. 1. The outer end 36 includes an outer engagement surface 40 and the inner end includes an engagement surface 42, whereby the outer engagement surface 40 is operable to receive an external force and transmit the force along the transverse axis 34 to the inner engagement surface 42, as will be discussed further below.

Figure 2:
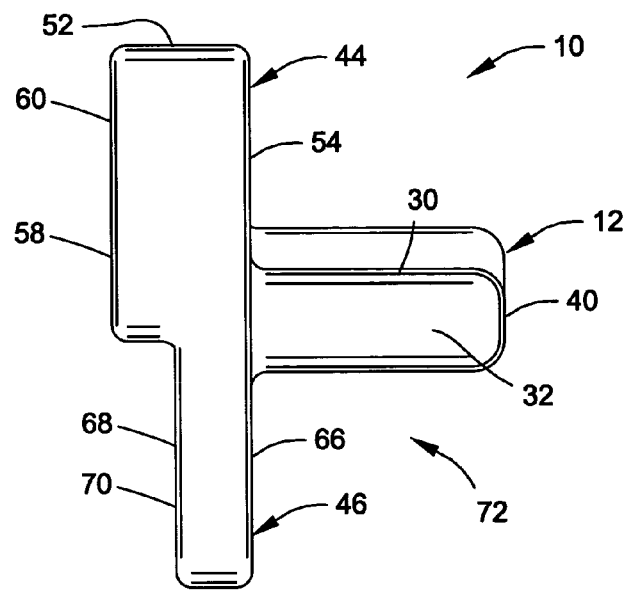
FIG. 2 is a front elevational view of the load transfer element of FIG. 1.

The attachment arm 14 is integrally formed with, and is offset from, the main body 12 such that main body 12 extends form the attachment arm 14, as best shown in FIG. 2. The attachment arm includes an upper portion 44 and a lower portion 46, whereby each of the upper and lower portions 44, 46 extend from the main body 12 in opposite directions. The upper portion 44 includes a proximate end 48 disposed at the junction of the main body 12 and a distal end 50 having an arcuate surface 52. In addition, the upper portion 44 includes a planar surface 54 extending between the proximate and distal ends 48, 50 on a first side 56 and includes a planar surface 58 formed on a second side 60, as best shown FIG. 2. The second side 60 extends from the attachment arm 14 for aid in attachment, as will be discussed further below.

Figure 3:
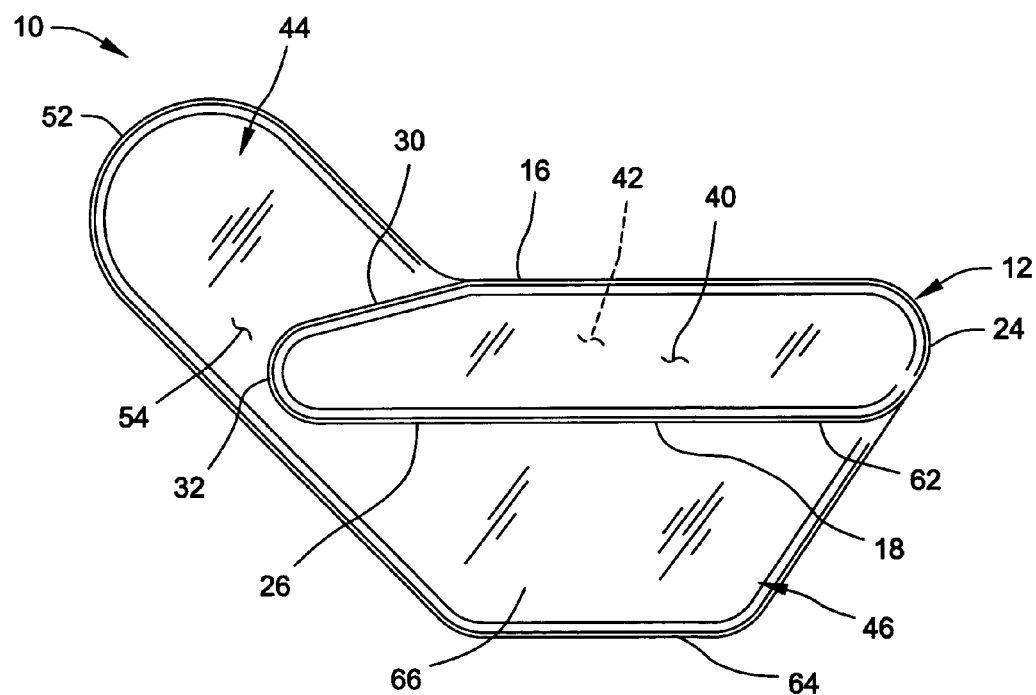
FIG. 3 is a side elevational view of the load transfer element of FIG. 1.

The lower portion 46 includes a proximate end 62 disposed at the junction between the lower portion 46 and the bottom surface 18 of the main body 12 and a distal end 64 extending generally away from the bottom surface 18, as best shown in FIGS. 2 and 3. The planar surface 54 extends from the first portion 44 generally over the second portion 46 on a first side 66 of the lower portion 46 while a planar surface 68 extends from a second side 70 of the lower portion 46 for aid in attachment, as will be discussed further below. In addition, a clearance space 72 is created between the bottom surface 18 of the main body 12 and the first side 66 of the lower portion 46, as best shown in FIG. 2.

Figure 4:
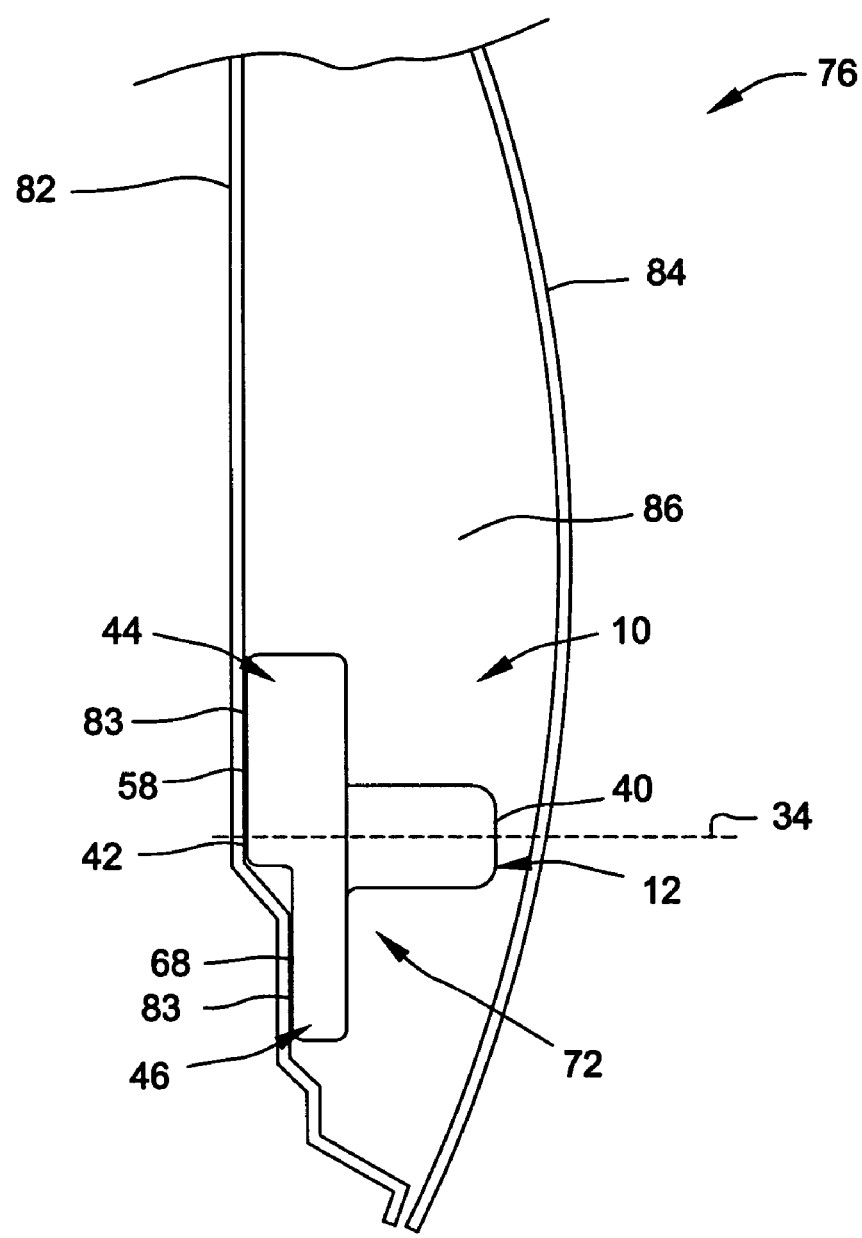
FIG. 4 is a cross-sectional view of a door assembly including a load transfer element in accordance with the principals of the present invention.
Figure 5:
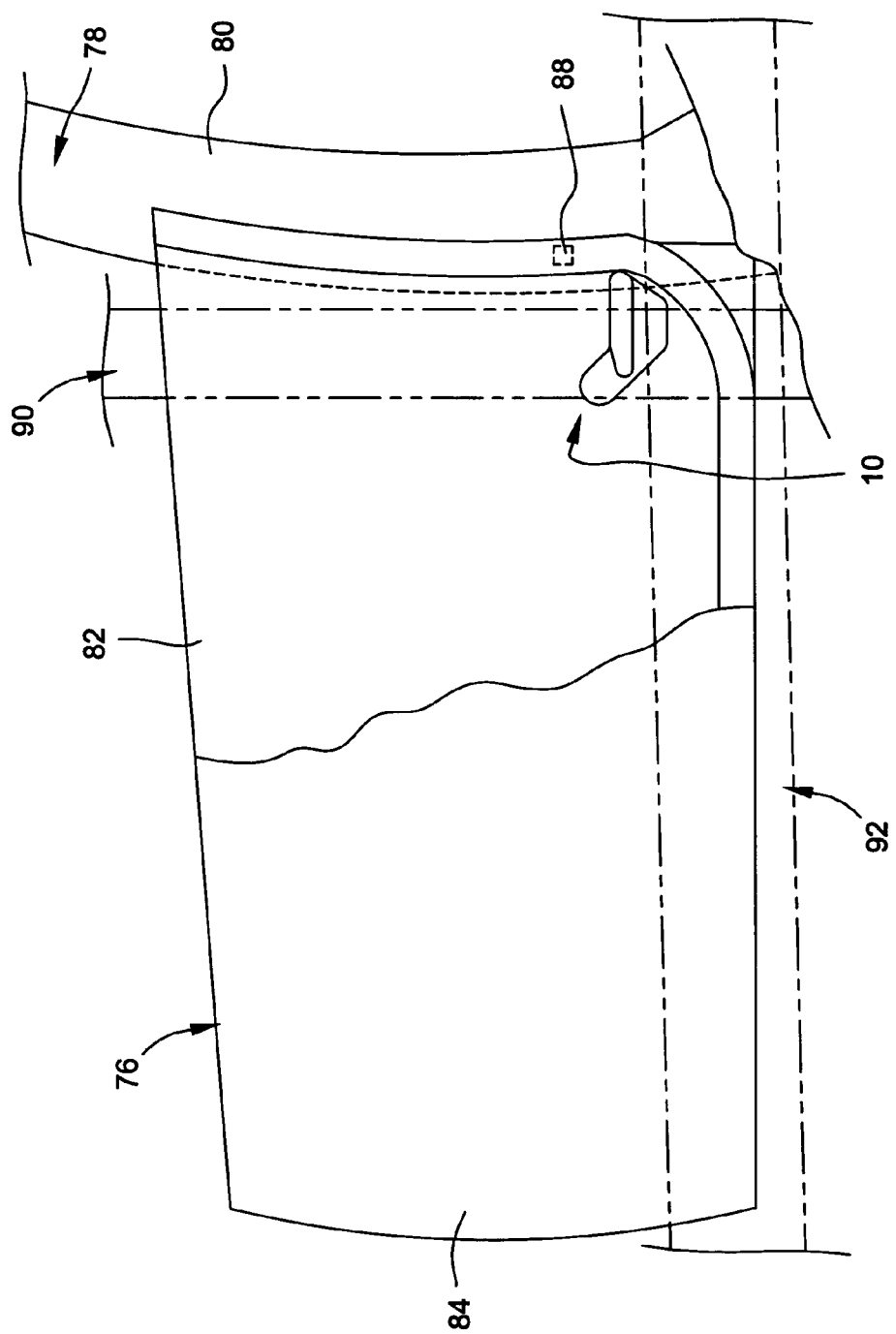
FIG. 5 is a side elevational view of the door assembly of FIG. 4.

With reference to FIGS. 4–5, the operation of the load transfer element 10 will be described in detail. The load transfer element 10 is shown incorporated into a door assembly 76 of a vehicle 78. The vehicle 78 includes a structural pillar 80 while the door assembly 76 includes an inner panel 82 and an outer panel 84. The inner panel 82 is fixedly attached to the outer panel 84 and is fixedly attached thereto such that an interstitial space 86 is created therebetween. In addition, the inner and outer panels 82, 84 overlap the structural pillar 80 such that the inner panel 82 is proximate the structural pillar 80 when the door is in a closed position.

The load transfer element 10 is disposed in the interstitial space 86 of the door assembly 76 and is fixedly attached to the inner panel 82. Specifically, the planar surface 58 of the upper portion 44 and the planar surface 68 of the lower portion 46 are fixedly attached to the inner panel 82 by a fastener such as a structural adhesive 83. In this manner, the inner engagement surface 42 abuts the inner panel 82 while the outer engagement surface 40 is disposed proximate the outer panel 84. It should be understood that while a structural adhesive is disclosed, any suitable fastener, such as a mechanical fastener, is anticipated and should be considered as part of the present invention.

In the event that the vehicle 78 is struck from the side such that a force is imparted on the outer panel 84 of the door assembly 76, the load transfer element 10 is operable to transfer the load from the outer panel 84 to the inner panel 82 and structural pillar 80. Specifically, when the outer panel 84 experiences a predetermined load, the outer panel 84 will deflect, thereby contacting the outer engagement surface 40 of the main body 12. Once the outer panel 84 deflects sufficiently, the force is transmitted to the inner engagement surface 42 and inner panel 82 along the transverse axis 34. For example, in a pole impact situation or simulated test, the load transfer element 10 is operable to receive a concentrated load from a pole 90 and transfer the load to the structural element 10 via the outer panel, 84, main body 12, and inner panel 82 along the transverse axis 34. As can be appreciated, the main body 12 ensures that the load will be transferred along the transverse axis 34 very quickly as the outer panel 84 only has to deflect a small amount prior to contacting the outer engagement surface 40. In this manner, the load applied to the outer panel 84 is also transferred to the inner panel 82 and structural pillar 80 almost immediately after the initial impact, as will be discussed further below.

By way of example, in a pole impact situation or simulated test, the load transfer element 10 is operable to receive a concentrated load from a pole 90. As pole 90 impacts and deflects outer panel 84, outer panel 84 contacts outer engagement surface 40 of load transfer element 10. This impact load is transferred through main body 12 to door inner panel 82 along longitudinal axis 34. As can be appreciated, the main body 12 ensures that the load will be transferred along the longitudinal axis 34 very quickly as the outer panel 84 only has to deflect a small amount prior to contacting the outer engagement surface 40. In this manner, the load applied to the outer panel 84 is transferred to inner panel 82 and structural pillar 80 almost immediately after the initial impact.

As the load transfer element 10 is disposed within the interstitial space 86 generally at a point at which the inner and outer panels 82, 84 overlap the structural pillar 80, the load transferred to the inner panel 82 will be immediately transferred to the structural pillar 80. In this regard, the load will reach the structural pillar 80 much quicker after the initial impact due to the interaction of the load transfer element 10, the door assembly 76, and the structural pillar 80.

As previously discussed, an air bag system is designed to operate only when a predetermined load is exerted on the air bag sensor 88. In this regard, the air bag sensor 88 should only fire the air bag when the impact load creates a sufficient acceleration signal. To accommodate this condition, the load transfer element 10 allows a low force of a predetermined magnitude to contact the outer panel 84 without sending a sufficient acceleration signal to the air bag sensor to deploy the air bag. Specifically, the load transfer element 10 allows the outer panel 84 to deflect into the clearance space 72 generally below the main body 12 such that the low impact force will not transfer through the main body 12 along the transverse axis 34. In this manner, the load transfer element 10 prevents the low impact force from reaching the inner panel 82 and structural pillar 80, thereby preventing a sufficient acceleration signal from being sent to the air bag sensor 88.

As previously discussed, an air bag system is designed to operate only when a predetermined impact load is exerted on the vehicle. This is generally accomplished through an air bag control system receiving an acceleration signal from sensor 88. In this regard, the air bag should fire when the impact load creates a sufficient acceleration signal, but not otherwise. To accommodate this condition, the load transfer element 10 allows a low force of a predetermined magnitude to contact the outer panel 84 without the air bag sensor 88 sending a sufficient acceleration signal to deploy the air bag. Specifically, the load transfer element 10 allows the outer panel 84 to deflect into the clearance space 72 generally below the main body 12 such that the low impact force will not transfer through the main body 12 along the longitudinal axis 34. In this manner, the load transfer element 10 prevents the low impact force from reaching the inner panel 82 and structural pillar 80, thereby preventing a sufficient acceleration signal from being sent to the air bag sensor 88.

The load transfer element 10 accommodates a low speed impact, such as those experienced in a simulated low speed impact by an FMVSS 214 barrier 92, by allowing the barrier 92 to contact the outer panel 84 at a location generally below the bottom surface 18 of the main body 12 and within clearance space 72, as best shown in FIG. 5. In this manner, a low impact force may be applied to the outer panel 84 without causing the force to be transmitted to the structural pillar 80. Specifically, as the outer panel 84 deflects, the outer engagement surface 40 will remain unaffected as the barrier 92 imparts the force generally below the main body 12 of the load transfer element 10. In this manner, the load transfer element 10 provides for near immediate transmission of a high impact force to the air bag sensor 88 while concurrently preventing a low speed or low impact force from reaching the sensor 88. In this regard, the load transfer element 10 is operable to reduce the time to fire for a side air bag while preventing unwanted and unnecessary deployment of the air bag in a low speed event.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A load transfer element for a vehicle door having an inner panel and an outer panel, the load transfer element comprising:
    a first portion having a first surface attached to the inner panel and a second surface facing the outer panel and formed on an opposite side of said first portion from said first surface; and
    a second portion extending from said first portion and having an upper surface and a lower surface formed substantially perpendicular to said second surface;
    wherein a clearance is defined between said lower surface of said second portion and said second surface of said first portion.

2. The load transfer element of claim 1, wherein said first portion further comprises an attachment arm operable to fixedly attach said first portion to the inner panel.

3. The load transfer element of claim 2, wherein said attachment arm is integrally formed with said first portion.

4. The load transfer element of claim 1, wherein said clearance is positioned to avoid transferring a predetermined load applied at the outer panel to the inner panel.

5. The load transfer element of claim 1, wherein said predetermined load is applied to the outer panel by an FMVSS 214 barrier.

6. A door assembly comprising;
    an inner panel;
    an outer panel fixedly attached to said inner panel, said inner and outer panels defining an interstitial space therebetween; and
    a load transfer element generally disposed within said interstitial space, said load transfer element operable to transfer an applied load from said outer panel to said inner panel while minimizing energy absorption of said applied load; and
    wherein said load transfer element is positioned within said interstitial space so as to avoid a test load from an FMVSS 214 barrier.

7. The door assembly of claim 6, wherein said load transfer element is fixedly attached to said inner panel.

8. The door assembly of claim 6, wherein said load transfer element is spaced apart from said outer panel.

9. A vehicle comprising:
    a door aperture having a first structural member and a second stuctural member;
    a door matingly received in said door aperture and supported by said first and second structural members, said door comprising:
        an inner panel hingedly attached to said first structural member at a first end and selectively engaging said second structural member at a second end;
        an outer panel fixedly attached to said inner panel, said inner and outer panels defining an interstitial space therebetween; and
        a load transfer element generally disposed between said outer panel and said second structural member, said load transfer element operable to transfer an applied load from said outer panel second structural member while minimizing energy absorption of said applied load;
    wherein said load transfer element is positioned within said interstitial space so as to avoid a test load from an FMVSS 214 barrier.

10. The vehicle of claim 9, further comprising a sensor disposed on said second structural member.

11. The vehicle of claim 10, wherein said sensor is generally disposed between said inner panel and said second structural member.

12. The vehicle of claim 10, wherein said sensor is an air bag sensor.

13. The vehicle of claim 9, wherein said load transfer element is fixedly attached to said inner panel.

14. The door assembly of claim 9, wherein said load transfer element is spaced apart from door outer panel.

* * * * *